US00RE49226E

(19) United States
(12) Reissued Patent
Gillon et al.

(10) Patent Number: US RE49,226 E
(45) Date of Reissued Patent: Sep. 27, 2022

(54) UEFI AND OPERATING SYSTEM DRIVER METHODS FOR UPDATING MAC ADDRESS IN LAN-BASED NIC

(71) Applicant: DELL PRODUCTS, L.P., Round Rock, TX (US)

(72) Inventors: James T. Gillon, Round Rock, TX (US); Thomas E. Voor, Cedar Park, TX (US); Nicholas D. Grobelny, Austin, TX (US); Nathan F. Martell, Taylor, TX (US)

(73) Assignee: Dell Products, L.P., Round Rock, TX (US)

(21) Appl. No.: 16/177,115

(22) Filed: Oct. 31, 2018

Related U.S. Patent Documents

Reissue of:
(64) Patent No.: 9,537,822
Issued: Jan. 3, 2017
Appl. No.: 14/446,442
Filed: Jul. 30, 2014

(51) Int. Cl.
*H04L 61/5038* (2022.01)
*H04L 61/5084* (2022.01)

(52) U.S. Cl.
CPC ..... *H04L 61/5038* (2022.05); *H04L 61/5084* (2022.05)

(58) Field of Classification Search
CPC ..... H04L 61/2038; H04L 61/6022
See application file for complete search history.

(56) References Cited

U.S. PATENT DOCUMENTS 6,640,278 B1 10/2003 Quant
7,240,364 B1 7/2007 Branscomb et al.
7,590,653 B2 * 9/2009 Sparks ..... H04L 41/12
8,260,891 B2 9/2012 Abels et al.
2008/0162800 A1 * 7/2008 Takashige ..... G06F 9/5077 711/104
2008/0175246 A1 * 7/2008 Kunhappan ..... H04L 61/2038 370/392
2009/0113046 A1 * 4/2009 Yajima ..... H04L 41/26 709/224
2012/0131157 A1 * 5/2012 Gospodarek ..... H04L 61/103 709/222
2013/0346628 A1 * 12/2013 Canion ..... H04L 63/0876 709/245
2014/0052403 A1 * 2/2014 Tang ..... G06F 11/2294 702/119
2014/0258700 A1 * 9/2014 England ..... G06F 21/51 713/2

(Continued)

OTHER PUBLICATIONS

Hull, et al.; "Harnessing PXE Boot Services in Linux Environments": Power Solutions (www.dell.com/powersolutions), Jun. 2004. pp. 117-120.

*Primary Examiner* — Eron J Sorrell
(74) *Attorney, Agent, or Firm* — Isidore PLLC

(57) ABSTRACT

An information handling system (IHS) unambiguously addresses networked devices connected by a local area network (LAN) based network interface controller (NIC) by detecting a device descriptor of LAN-based NIC, determining that the device descriptor indicates a capability for assigning a reserve media access control (MAC) address to the networked device, writing the reserve MAC address in the LAN-based NIC of the networked device, and associating the reserve MAC address with the networked device in an inventory data structure for the IHS.

25 Claims, 6 Drawing Sheets

Amended

(56) References Cited

U.S. PATENT DOCUMENTS

| | | | | |
|---|---|---|---|---|
| 2014/0281577 | A1* | 9/2014 | Nicholes | G06F 21/85<br>713/189 |
| 2015/0016417 | A1* | 1/2015 | Dees | H04W 88/08<br>370/331 |

* cited by examiner

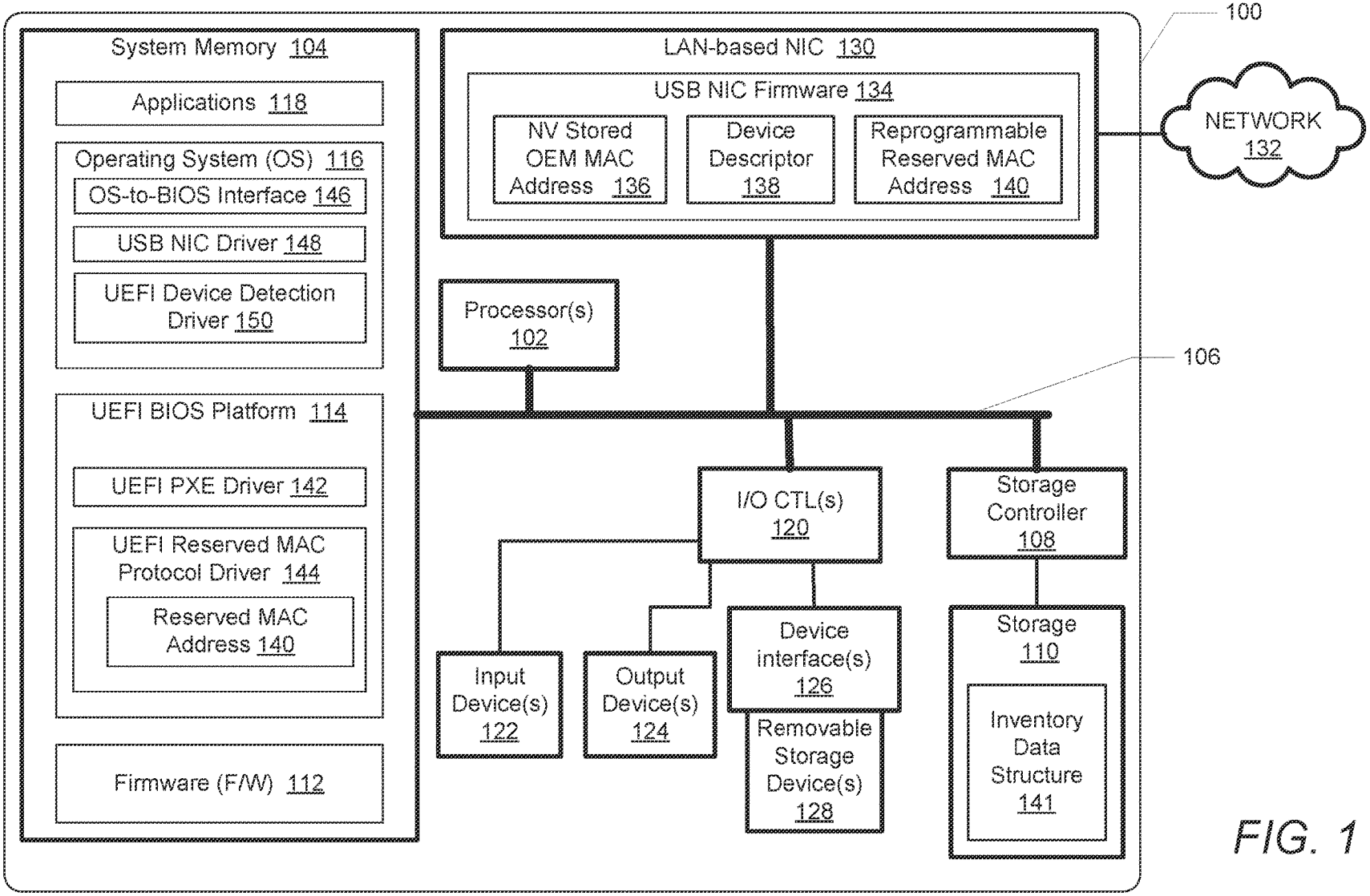
FIG. 1
Amended

UEFI AND OPERATING SYSTEM DRIVER METHODS FOR UPDATING MAC ADDRESS IN LAN-BASED NIC

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Technical Field

This disclosure relates generally to information handling systems, and more particularly to managing media access control (MAC) addresses for networked devices.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In systems management, the media access control (MAC) address of a networked device is often used to uniquely identify that system for targeted deployment of an operating system (OS) or for identification after OS deployment. An example is a Configuration Manager (ConfigMgr for short). When the networked device is first entered into the ConfigMgr database, the ConfigMgr database captures the MAC address which is then used to identify the networked device. Networked devices that include a network interface controller (NIC) generally have a MAC address that is hard coded. NICs are also known as network adapters, local area network (LAN) adapters, and similar terms. Ethernet standard is one ubiquitous used in NICs. Ethernet-based NICs are often included as an expansion card or built into the motherboard of the networked device.

In many instances, however, networked devices are being developed with no onboard NIC. For example, a number of networked devices such as laptops can be connected to an enterprise system via a docking station. For each of the laptops, an original eqiupment manufacturer (OEM) MAC address provisioned in a universal serial bus (USB) NIC is used many times used over and over when first registering these laptops into the ConfigMgr database. This results in many networked devices getting registered with the same MAC address. In another scenario, a single networked device such as a laptop is used at different physical locations, such as at one or more work locations and at the user's home. A different docking station or network dongle at each location can have a different physical NIC that is then used for the same networked device. In both instances, the overall ecosystem is harder to manage.

BRIEF SUMMARY

Disclosed is a method of unambiguously addressing networked devices in an information handling system (IHS). In one embodiment, the method includes detecting a device descriptor of a local area network (LAN) based network interface controller (NIC) connected to a networked device. The method further includes determining that the device descriptor indicates a capability for assigning a reserve media access control (MAC) address to the networked device. The method further includes provisioning the reserve MAC address in the LAN-based NIC of the networked device. The method includes associating the reserve MAC address with the networked device in an inventory data structure for the IHS for unambiguously addressing the networked device.

According to at least one aspect of the present disclosure, an IHS is provided to unambiguously address networked devices. In one embodiment, the IHS includes a LAN-based NIC and a networked device connected to the LAN-based NIC. The IHS includes a system operably in communication with the LAN-based NIC to detect a device descriptor of the LAN-based NIC. The system is further operable to determine that the device descriptor indicates a capability for assigning a reserve MAC address. The system is further operable to provision the LAN-based NIC with the reserve MAC address. The system is further operable to associate the reserve MAC address with the networked device in an inventory data structure for the IHS for unambiguously addressing the networked device.

According to at least one aspect of the present disclosure, a system unambiguously addresses networked devices. In one embodiment, the system includes a processor and an operating system driver executed by the processor and in communication with a LAN-based NIC that is connected to a networked device. The operating system driver is operable to detect a device descriptor of the LAN-based NIC. The operating system driver is further operable to determine that the device descriptor indicates a capability for assigning a reserve MAC address to the networked device. The operating system driver is operable to provision the LAN-based NIC with the reserve MAC address. The operating system driver is operable to associate the reserve MAC address with the networked device in an inventory data structure.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1 illustrates an example information handling system within which various aspects of the disclosure can be implemented, according to one or more embodiments;

DETAILED DESCRIPTION

Figure 2:
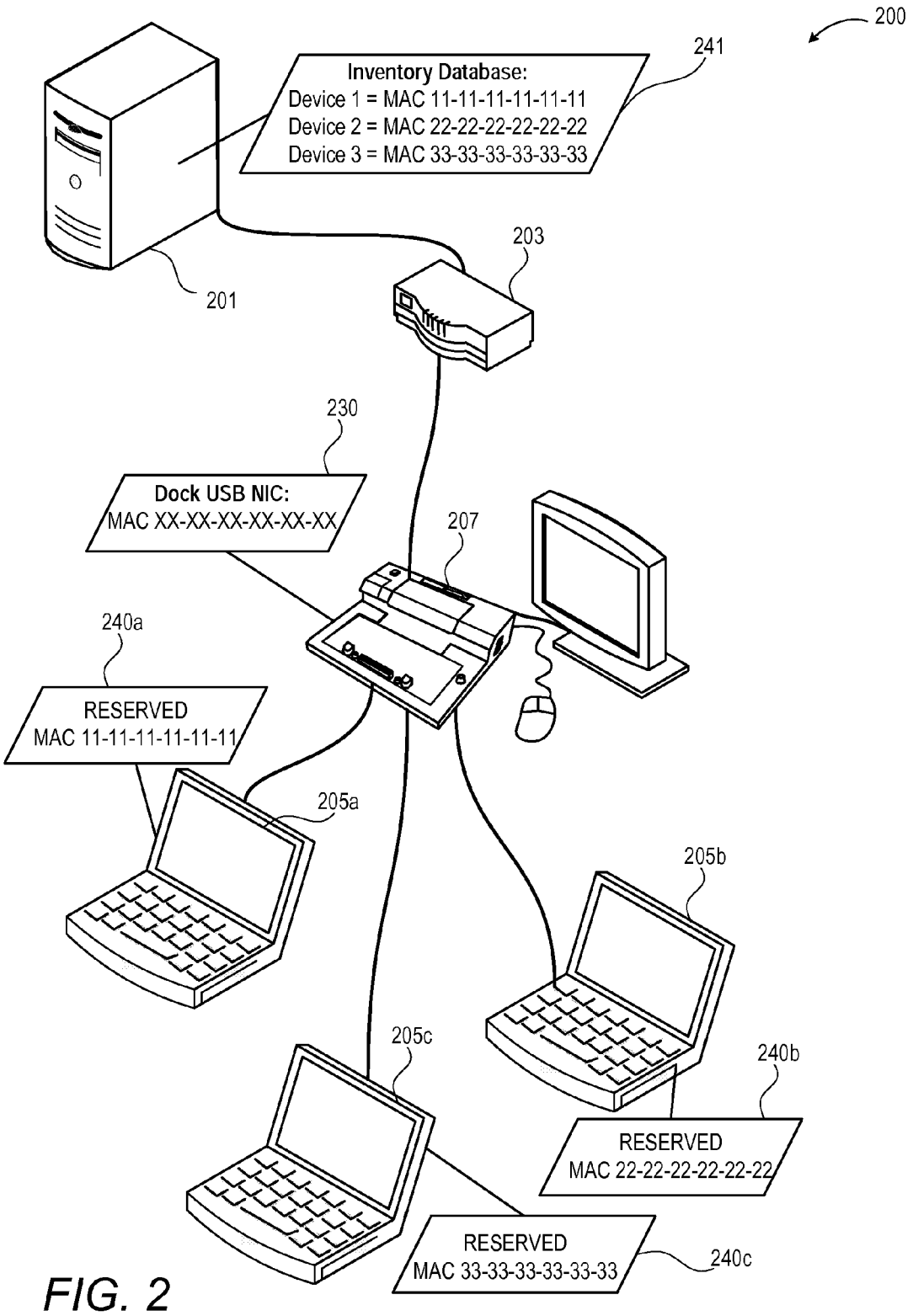
FIG. 2 illustrates an IHS having three networked devices that at different times utilize a local area network (LAN)-based network interface controller (NIC), according to one embodiment.

An information handling system (IHS) unambiguously addresses networked devices connected by a local area network (LAN) based network interface controller (NIC) by: detecting a device descriptor of LAN-based NIC; determining that the device descriptor indicates a capability for assigning a reserve media access control (MAC) address to the networked device; provisioning the reserve MAC address in the LAN-based NIC of the networked device; and associating the reserve MAC address with the networked device in an inventory data structure for the IHS.

The present disclosure further provides for an IHS and method for programming a reserved MAC address stored in the Unified Extensible Firmware Interface (UEFI) Basic Input/Output System (BIOS). Proprietary communication protocols are provided for both an operating system (OS) driver and UEFI Preboot eXecution Environment (PXE) driver to uniquely identify networked devices that otherwise would be identified by duplicative MAC addresses. Rather than a manual MAC address replacement, the present disclosure provides for automatic changing of a MAC address without necessarily having a physical network interface controller (NIC) to go along with this MAC address.

The reserved MAC Address as used herein refers to a MAC address that can be used for a local area network (LAN) based NIC, such as connected via a universal serial bus (USB). The UEFI Basic Input/Output System (BIOS) can add a new SMBIOS interface that the OEM can utilize via custom tools to program the reserved MAC Address in the write-once, non-volatile storage of the BIOS. The System Management BIOS (SMBIOS) specification defines data structures (and access methods) that can be used to read information stored in the BIOS of a computer as defined by the Distributed Management Task Force (DMTF). This reserved MAC address can be specific to a given system. This level of security at the enterprise system level can prevent malicious entities from modifying the reserved MAC address.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts, with like numerals denoting like components throughout the several views. However, it will be apparent to those skilled in the art that these concepts may be practiced without these specific details. In some instances, well known structures and components are shown in block diagram form in order to avoid obscuring such concepts.

FIG. 1 illustrates a block diagram representation of an example information handling system (IHS) 100, within which one or more of the described features of the various embodiments of the disclosure can be implemented. For purposes of this disclosure, the information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display.

Referring specifically to FIG. 1, example IHS 100 includes one or more processor(s) 102 coupled to system memory 104 via system interconnect 106. System interconnect 106 can be interchangeably referred to as a system bus, in one or more embodiments. Also coupled to system interconnect 106 is a local storage controller 108 coupled to local storage 110 within which can be stored software and one or more sets of data. For example, local storage 110 can contain an inventory data structure 141 that tracks MAC addresses of networked devices. As shown, system memory 104 can include therein a plurality of modules, including firmware (F/W) 112, UEFI BIOS platform 114, operating system (O/S) 116 and application(s) 118. The various software and/or firmware modules have varying functionality when their corresponding program code is executed by processor(s) 102 or other processing devices within IHS 100.

The Unified Extensible Firmware Interface (UEFI) is a specification that defines a software interface between an operating system and platform firmware. UEFI is meant to replace the Basic Input/Output System (BIOS) firmware interface, present in a majority of conventional PC-compatible personal computers. In practice, most UEFI images provide legacy support for BIOS services. UEFI can support remote diagnostics and repair of computers, even without another operating system.

IHS 100 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output devices 124, such as a monitor or display device or audio speaker(s). Additionally, in one or more embodiments, one or more device interfaces 126, such as an optical reader, a universal serial bus (USB), a card reader, Personal Computer Memory Card International Association (PCMCIA) port, and/or a high-definition multimedia interface (HDMI), can be associated with IHS 100. Device interface(s) 126 can be utilized to enable data to be read from or stored to corresponding removal storage device(s) (RSDs) 128, such as a compact disk (CD), digital video disk (DVD), flash drive, or flash memory card. In one or more embodiments, device interface(s) 126 can also provide an integration point for connecting other device(s) to IHS 100. In such implementation, device interfaces 126 can further include General Purpose I/O interfaces such as $I^2C$, SMBus, and peripheral component interconnect (PCI) buses.

IHS 100 includes a network interface device (NID), which in one or more embodiments is a LAN-based NIC 130. LAN-based NIC 130 enables IHS 100 to communicate and/or interface with other devices, services, and components that are located external to IHS 100. These devices, services, and components can interface with IHS 100 via an external network, such as example network 132, using one or more communication protocols. Network 132 can be a local area network, wide area network, personal area network, and the like, and the connection to and/or between network and IHS 100 can be wired or wireless or a combination thereof. For purposes of discussion, network 132 is indicated as a single collective component for simplicity. However, it is appreciated that network 132 can comprise one or more direct connections to other devices as well as a more complex set of interconnections as can exist within a wide area network, such as the Internet.

In one or more embodiments, IHS 100 includes features for automatic changing of a MAC address without necessarily having a physical NIC to go along with this MAC address. With particular reference to FIG. 1, the LAN-based NIC 130 can include LAN-based NIC firmware 134 having nonvolatile (NV) stored OEM MAC address 136, a device descriptor 138 and a reserved MAC address 140 that is reprogrammable. The UEFI BIOS platform 114 includes a UEFI PXE driver 142 and a UEFI reserved MAC protocol driver 144 that stores the reserved MAC address 140 in system memory 104. OS 116 includes an OS-to-BIOS interface 146, a USB NIC driver 148, and UEFI device detection driver 150.

In one or more embodiments, the LAN-based NIC 130 can utilize Universal Serial Bus (USB) technology. In one embodiment, the LAN-based NIC 130 complies with another LAN-based protocol such as FireWire (IEEE 1394), Ethernet (IEEE 802.3), and Token Ring (IEEE 802.5), etc.

FIG. 2 illustrates an IHS 200 having a system 201 that communicates via a router 203 to three networked devices 205a-c, depicted as laptops, which at different times utilize a network connection device depicted as docking station 207. In another embodiment, the network connection device may be a network dongle. The docking station 207 has an OEM MAC address associated with its USB NIC 230 that ordinarily would be reused for each of the networked devices 205a-c. In one or more embodiments, each of the networked devices 205a-c is associated respectively with a reserved MAC address 240a-c. In particular, each networked device 205a-c has a reserved MAC address 240a-c that is not associated with a physical local area network (LAN)-based NIC within the networked device 205a-c. The system 201 manages an IHS inventory list database 241 by referencing the reserved MAC addresses 240a-c, rather than the OEM MAC address of the USB NIC associated with the docking station or dongle.

The networked devices 205a-c may have a LAN on Mother Board (LOM) with a MAC (LOM MAC) address. Either this LOM MAC address or a different virtual MAC address that may be created is stored as a reserved MAC address 240a-c for use with docking station 207 or USB NIC 230. When the networked device 205a-c is connected to docking station 207 that contains a physical NIC (not shown) or to a USB NIC 230 with the capability for a reserved MAC address 240a-c, the physical NIC or the USB NIC 230 automatically communicates with the networked device 205a-c and spoofs the OEM MAC address provided by the networked device 205a-c instead of using its own OEM MAC address. In this manner, the same physical NIC or USB NIC 230 can be used for multiple networked devices 205a-c to register the individual devices 205a-c in the IHS inventory list database 241. The reserve MAC addresses, rather than the MAC address of the physical NIC or USB NIC 230, can be used in that registration.

Figure 3:
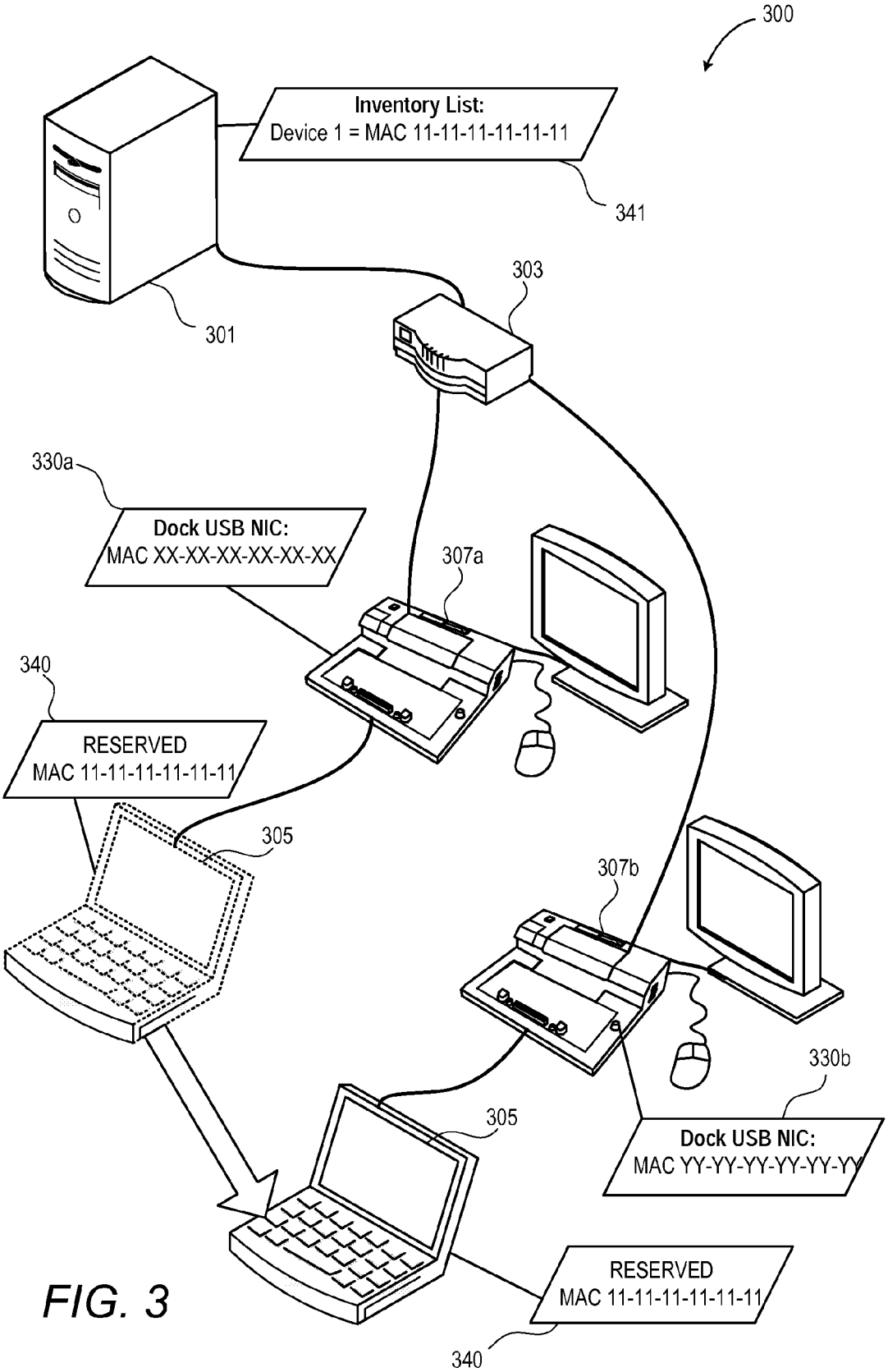
FIG. 3 illustrates an IHS having one networked device that at different times utilizes two LAN-based NICs, according to one embodiment.

FIG. 3 illustrates an IHS 300 having a system 301 that communicates via a router 303 to a networked device 305, depicted as a laptop, which at different times utilizes one of two docking stations 307a-b. According to one aspect of the disclosure, the system 301 assures that a unique reserve MAC address 340 is assigned to the networked device 305 during device registration. In addition, the system 301 assures that the reserve MAC address 340 follows the networked device 305 in later connections to docking stations 307a-b. The system 301 tracks the networked device 305 in an inventory list database 341. Each docking station 307a-b has an OEM MAC address associated with its USB NIC 330a-b that ordinarily would be used for the same networked device 305. In one or more embodiments, the networked device 305 is associated with a reserved MAC address 340. In particular, the networked device 305 has a reserved MAC address 340 that is not associated with a physical local area network (LAN)-based NIC within the networked device 305. The assignment and usage of the reserve MAC address 340 provides the device 305 with the ability to be uniquely identified regardless of changing physical docking stations 307a-b or USB NIC 330a-b. The system 301 can manage an inventory list database 341 of the reserved MAC addresses [240] *340* even when the networked device 305 connects to a different docking station 307a-b.

In one embodiment, the networked device 305 can be responsible for maintaining and providing its own reserved MAC address internally. Devices of the IHS 300 such as a configuration server (not shown) can be responsible for querying each networked device 305 to retrieve the current device MAC address, which happens to be the reserved MAC, after the networked device 305 updates the MAC address as it connects to a docking station 307a-b. The configuration server can retain the results of the MAC query as the reserved MAC address in the server's inventory list as a way to reference and identify that networked device 305 uniquely.

In one usage case, the system 301 tracks software licensing as part of cloud licensing. For example, a user may subscribe to license software or media content for a predetermined number of MAC addresses, such as three or five. Absent the above described functionality provided as one aspect of the present disclosure, a single networked device 305 used at different USB NICs 330a-b can appear to the system 301 to be more than one networked device 305, unnecessarily exhausting at least a portion of the license grant.

Figure 4:
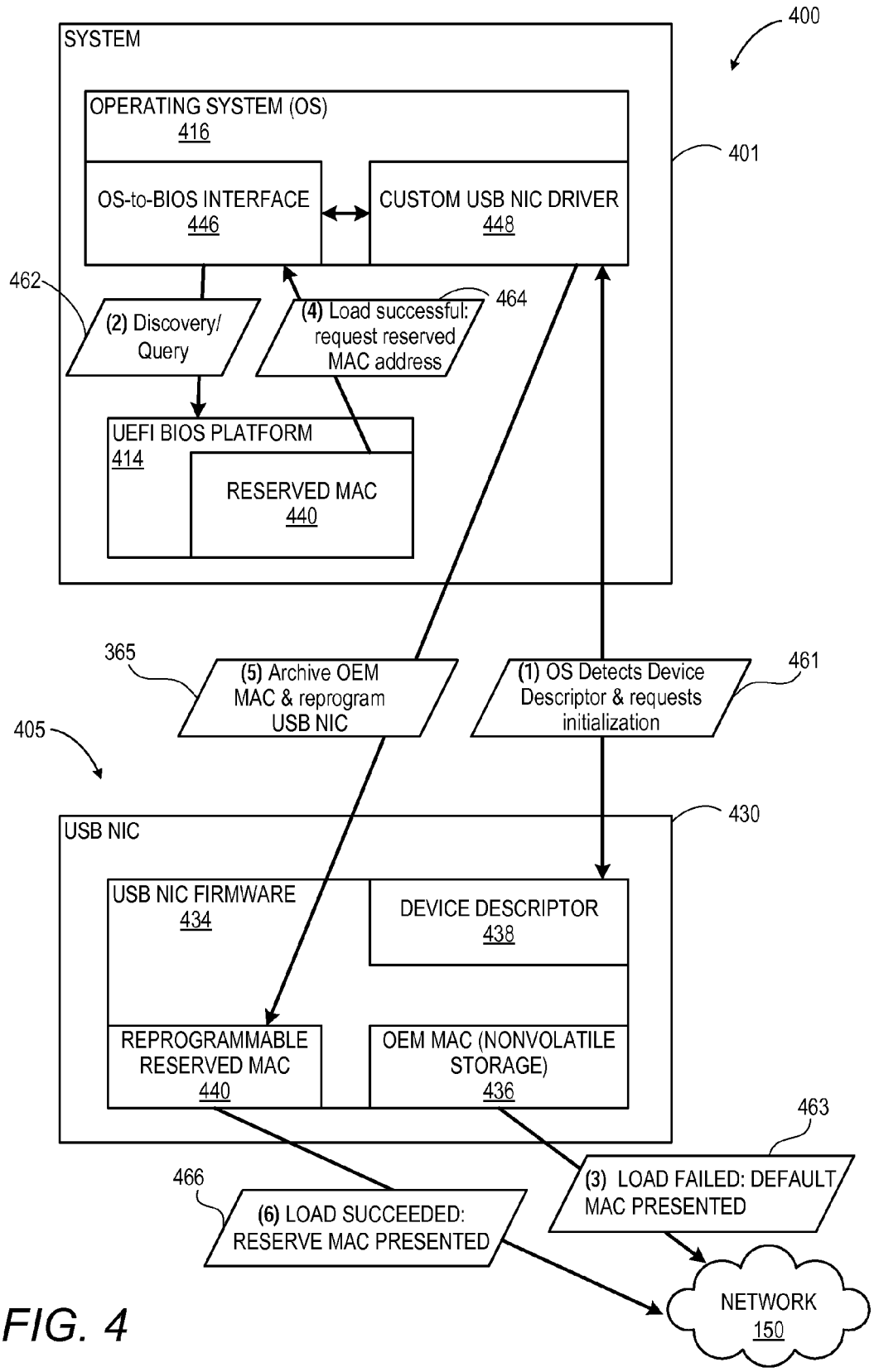
FIG. 4 illustrates a diagram of an IHS that updates LAN-based NIC with a reserved MAC address in response to detecting a connection or in response to booting, according to one embodiment.

FIG. 4 illustrates usage cases for an IHS 400 dynamically updating a USB NIC 430 with a reserved MAC address 440 of a networked device 405, in one of the following two situations: (1) during a boot up of the IHS 400 that occurs while the USB NIC 430 is connected to the networked device 405; or (2) when the USB NIC 430 is hot plugged to the IHS 400. In both cases, a custom USB NIC driver 448 can be employed for the USB NIC 430. This USB NIC driver 448 can leverage a secure OS-to-BIOS interface 446, such as Dell's OS Protocol Access. All other driver-level interfaces (not shown) that can update the MAC address may be disabled, such as would be used in a vendor utility.

An exemplary sequence of events for this path can be as follows: (1) OS 416 detects USB NIC 430 with a custom device descriptor 438, which requests that the custom USB NIC driver 448 begin its initialization path (block 461). (2) The USB NIC driver 448 attempts to communicate over the secure OS-to-BIOS interface by sending a pre-defined discovery/query command to the BIOS (block 462). (3) If unsuccessful, the USB NIC driver will abort the MAC address update, and continue to load with the MAC address that was programmed into the device by the manufacturer (block 463). (4) If successful, the USB NIC driver 448 requests that the UEFI BIOS platform 414 send the reserved MAC address 440 (block 464). (5) Once the USB NIC driver receives the reserved MAC Address, the USB NIC driver 448 archives the OEM MAC address 436 in the NIC internal non-volatile storage (not shown), and then reprograms the USB NIC 430 (block 465). (6) The USB NIC driver 448 continues to load as usual, whereby operation of the USB NIC 430 behaves as normal with the only exception being the updated reserved MAC Address 440 (block 466). The reserved MAC address may be cleared from the USB NIC 430 when the networked device 405 is detached from the USB NIC 430 to prevent duplicate MAC addresses on the IHS 400. In one embodiment, the host system is not required to clear the reserved MAC address 440 in the USB NIC 430. The USB NIC firmware 434 or hardware of the USB NIC 430 can be required to re-initialize to the OEM MAC address 436 any time power is lost to prevent a reserved MAC address 440 from becoming "sticky" to the networked device 405. For example, the networked device 405 may leave the IHS 400 for another IHS (not shown).

Figure 5:
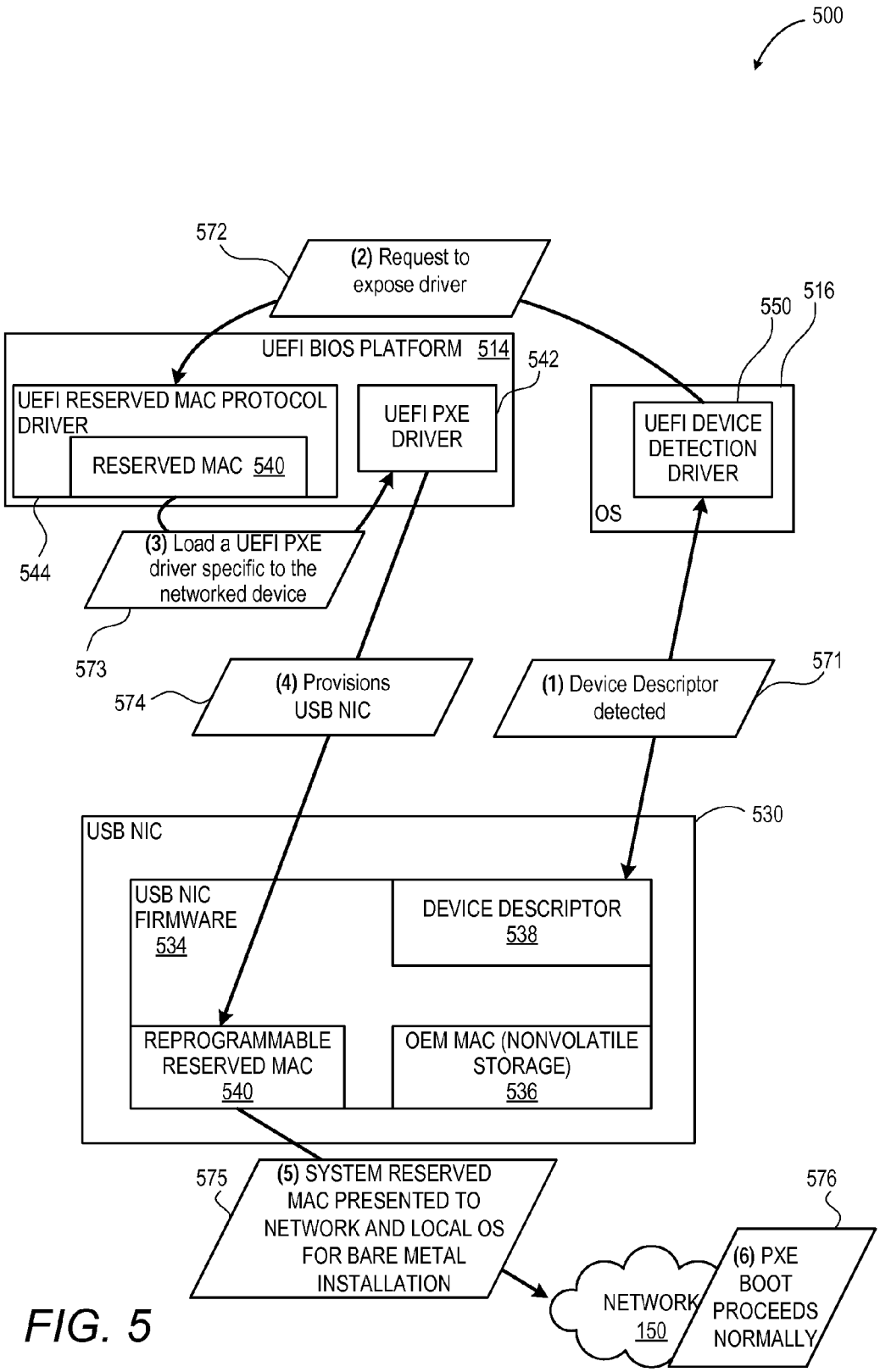
FIG. 5 illustrates a diagram of an IHS that updates LAN-based NIC with a reserved MAC address in response to an operating system install when no data resides on a primary hard drive.

FIG. 5 illustrates an IHS 500 in the case of a bare metal install of an OS by utilizing a UEFI PXE driver 542 rather than the OS-to-BIOS interface 146 (FIG. 1) when no data resides on a primary hard drive. The UEFI PXE driver 542 that is included in the UEFI BIOS platform 514 can be required to expose an interface of a UEFI reserved MAC protocol *driver* 544, whereby the UEFI BIOS platform 514 can provide the reserved MAC address 540.

The Preboot eXecution Environment (PXE, also known as Pre-Execution Environment; sometimes pronounced "pixie") is an environment to boot computers using a network interface independently of data storage devices or installed operating systems. PXE makes use of several network protocols like Internet Protocol (IPv4), User Datagram Protocol (UDP), Dynamic Host Configuration Protocol (DHCP) and Trivial File Transfer Protocol (TFTP) and of concepts like globally unique identifier (GUID), universally unique identifier (UUID) and Universal Network Device Interface and extends the firmware of the PXE client (the computer to be bootstrapped via PXE) with a set of predefined application programming interfaces (APIs). The firmware on the client tries to locate a PXE redirection service on the network (Proxy DHCP) in order to receive information about available PXE boot servers. After parsing the answer, the firmware will ask an appropriate boot server for the file path of a network bootstrap program (NBP), download the NBP into the computer's random-access memory (RAM) using TFTP, possibly verify the NBP, and finally execute the NBP.

With further reference to FIG. 5, an exemplary sequence of events for this path is as follows: (1) USB NIC 530 with a specific device descriptor 538 that is indicative of a reserve MAC address 540 is detected by the UEFI BIOS platform 514 (block 571); (2) The UEFI reserved MAC protocol driver 544 that allows for the communication of the reserved MAC address 540 is exposed (block 572); (3) The UEFI PXE driver 542 that is specific to this device is loaded, and the UEFI BIOS platform 514 communicates the reserved MAC address 540 to the UEFI PXE driver 542 (block 573); (4) The UEFI PXE driver 542 archives the original MAC address 536 in internal non-volatile storage of the USB NIC 530 and then provisions the USB NIC 530 with the reserved MAC address 540 (block 574); (5) Operation of the USB NIC 530 behaves as normal, with the only exception being the updated reserve MAC address 540 that is presented to network and local OS for bare metal installation (block 575); (6) The UEFI PXE driver 542 continues to load as usual (block 576).

Figure 6:
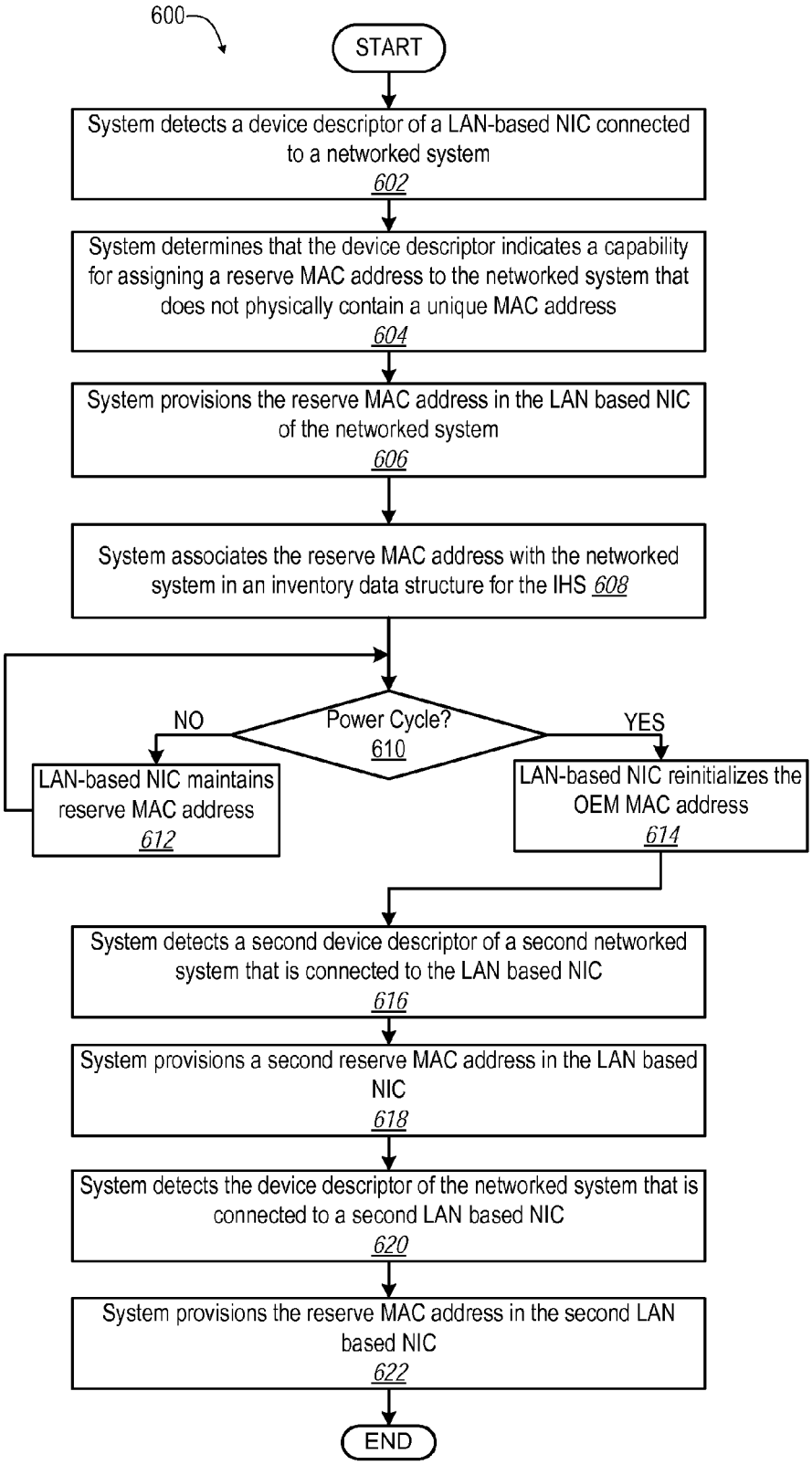
FIG. 6 illustrates a flow diagram of an exemplary method [for] of unambiguously addressing networked devices in an IHS, according to one or more embodiments.

With reference to FIG. 6, a method 600 is provided for unambiguously addressing networked devices in an IHS. In one embodiment, *illustrated* in FIG. 6A, the method 600 includes a system detecting a device descriptor of a LAN-based NIC connected to a networked device that does not physically contain a unique MAC address (block 602). The system determines that the device descriptor indicates a capability for assigning a reserve MAC address to the networked device (block 604). The system provisions the reserve MAC address in the LAN-based NIC [of the networked device] (block 606). The system can associate the reserve MAC address with the networked device in an inventory data structure for the IHS in order to unambiguously address the networked device (block 608).

In one embodiment, the LAN-based NIC determines whether the networked device has undergone a power cycle (block 610). In response to determining in block 610 that the network system has not been undergone a power cycle, the LAN-based NIC maintains the reserve MAC address (block 612). Processing returns to block 610. In response to determining (or detecting) in block 610 that the networked device has been disconnected from the LAN-based NIC, the LAN-based NIC re-initializes an OEM MAC address for the LAN-based NIC (block 614).

Without a reserve MAC address, ambiguous addressing can arise from more than one networked device connecting to the IHS at various times via the same LAN-based NIC. Thus, in one embodiment, the method 600[, continued in FIG. 6B,] further includes the system detecting a second device descriptor of a second networked device that is connected to the LAN-based NIC (block 616). The system provisions a second, different reserve MAC address in the LAN-based NIC (block 618).

Without a reserve MAC address, ambiguous addressing can also arise from the same networked device connecting to the IHS at various times via different LAN-based NICs. Thus, in one embodiment the method 600 further includes the system detecting the device descriptor of the networked device that is connected to a second LAN-based NIC (block 620). The system provisions the second LAN-based NIC with the previously-assigned reserve MAC address of the networked device (block 622).

In one embodiment, the method 600 further includes the system detecting the presence of the networked device by an operating system driver during one of a boot of the IHS and a hot plugging of the network system. The method 600 includes the operating system driver provisioning the reserve MAC address in the LAN-based NIC. In an exemplary embodiment, the method 600 includes sending a command by the operating system driver over an operating system to BIOS interface to a UEFI BIOS. The method 600 then includes receiving the reserve MAC address from the UEFI BIOS.

In one embodiment, the method 600 includes detecting the presence of the networked device by an operating system driver during *installation* of an operating system of the IHS. The method 600 includes accessing a UEFI [reserve] *reserved* MAC protocol *driver* to expose a UEFI PXE driver that is specific to the device descriptor. The method 600 further includes loading the UEFI PXE driver into a UEFI platform. The method 600 includes provisioning the LAN-based NIC with the reserve MAC address using the UEFI PXE driver.

In the above described flow [charts] *chart* of FIG. 6, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of [unambiguously] addressing networked devices in an information handling system (IHS), the method comprising:

detecting a device descriptor of a local area network [(LAN) based] *(LAN)-based* network interface controller (NIC) connected to a networked device [that does not physically contain a unique MAC address];

determining that the device descriptor indicates a capability for assigning a [reserve] media access control (MAC) address to the networked device;

*archiving an original equipment manufacturer (OEM) MAC address of the LAN-based NIC into a non-volatile storage of the LAN-based NIC; and* provisioning the [reserve] MAC address in the LAN-based NIC [of the networked device;

associating the reserve MAC address with the networked device in an inventory data structure of the IHS;

detecting a presence of the networked device by an operating system of the IHS;

accessing a Unified Extensible Firmware Interface (UEFI) reserve MAC protocol to expose a UEFI Preboot eXecution Environment (PXE) driver that is specific to the device descriptor;

loading the UEFI PXE driver into a UEFI platform; and provisioning the LAN-based NIC with the reserve MAC address using the UEFI PXE driver] *in place of the archived OEM MAC address*.

2. The method of claim 1, *wherein the LAN-based NIC provides LAN connectivity between the IHS and the networked device, the method* further comprising:

detecting the presence of the networked device by an operating system driver during one of a boot of the IHS and a hot plugging of a network system; [and]

the operating system driver provisioning the [reserve] MAC address in the LAN-based NIC *for use in place of an OEM programmed MAC address of the LAN-based NIC; and*

*associating the MAC address with the networked device in an inventory data structure of the IHS.*

3. The method of claim 2, further comprising:

sending a command over an operating system to a basic input/output system (BIOS) interface [to an] *of a* Unified Extensible Firmware Interface (UEFI) BIOS; and receiving the [reserve] MAC address from the UEFI BIOS.

4. The method of claim 1, further comprising:

re-initializing an original equipment manufacturer (OEM) MAC address for the LAN-based NIC in response to a power cycle of the networked device.

5. The method of claim 1, further comprising:

detecting [a second device descriptor of] a second networked device [that is] connected to the LAN-based NIC; and provisioning a second [reserve] MAC address in the LAN-based NIC, where the second [reserve] MAC address *is assigned to the second networked device* and [a first reserve] *the* MAC address *and second MAC address* are [unique reserve] *different* MAC addresses.

6. The method of claim 1, further comprising:

detecting [the] *a second* device descriptor of [the networked device connected to] a second LAN-based NIC *to which the networked device is connected, the second device descriptor also indicating a capability for assigning a second MAC address to the second LAN-based NIC*; and provisioning the second [based] *LAN-based* NIC with the [reserve] MAC address that *was previously assigned to and* is associated with the networked device.

7. An information handling system (IHS) [to unambiguously address networked devices, the IHS] comprising:

a local area network (LAN) based network interface controller (NIC);

a networked device connected to the LAN-based NIC*, the LAN-based NIC external to the networked device*; and a system *that manages an IHS inventory list database, the system physically interconnected to the networked device via the LAN-based NIC and* having a processor operably in communication with the LAN-based NIC to:

detect a device descriptor of the LAN-based NIC;

determine that the device descriptor indicates a capability for assigning a [reserve] media access control (MAC) address to the networked device *that connects to the system via the LAN-based NIC*;

*archive an original equipment manufacturer (OEM) MAC address of the LAN-based NIC into a non-volatile storage of the LAN-based NIC; and* provision the LAN-based NIC with [the reserve] *a* MAC address[;

associate the reserve MAC address with the networked device in an inventory data structure for the HIS;

detect the presence of the networked device by an operating system of the IHS;

access a Unified Extensible Firmware Interface (UEFI) reserve MAC protocol to expose a UEFI Preboot eXecution Environment (PXE) driver that is specific to the device descriptor;

load the UEFI PXE driver into a UEFI platform; and provision, by using the UEFI PXE driver, the LAN-based NIC with the reserve MAC address] *in place of the archived OEM MAC address*.

8. The IHS of claim 7, wherein *the LAN-based NIC provides LAN connectivity between the IHS and the networked device and* the system is further operable to:

detect the presence of the networked device by an operating system driver during one of a boot of the IHS and a hot plugging of a network system; [and]

provision the reserve MAC address in the LAN-based NIC by the operating system driver *for use in place of an OEM programmed MAC address of the LAN-based NIC; and*

*associate the MAC address with the networked device in an inventory data structure of the IHS.*

9. The IHS of claim 8, wherein the system is further operable to:

send a command by [an] *the* operating *system* driver over an operating system to a basic input/output system (BIOS) interface to an Unified Extensible Firmware Interface (UEFI) BIOS; and receive the reserve MAC address from the UEFI BIOS.

10. The IHS of claim 7, wherein the system is further operable to:

re-initialize an original equipment manufacturer (OEM) MAC address for the LAN-based NIC in response to a power cycle of the networked device.

11. The IHS of claim 7, wherein the system is further operable to:

detect a [second device descriptor of a] second networked device [that is] connected to the LAN-based NIC; and provision the LAN-based NIC with a second [reserve] MAC address *that is assigned to the second networked device, the second MAC address being a different MAC address from the MAC address associated with the networked device*.

12. The IHS of claim 7, wherein *the* system is operable to:

detect [the device descriptor of] the networked device [that is] connected to a second LAN-based NIC; and provision the second LAN-based NIC with [a reserve] *the* MAC address that [is] *was previously assigned and* associated with the networked device.

13. A system that [unambiguously] addresses networked devices in a distributed information handling system (IHS), the system comprising:

[a processor;

an operating system driver executed by the processor and in communication with] a local area network (LAN) based network interface controller (NIC) that is *external to and* connected to a networked device[, the operating system driver]*;*

*a memory comprising an IHS inventory list database managed by the system, the system physically interconnected to the networked device via the LAN-based NIC; and*

*a processor communicatively connected to the LAN-based NIC and which executes firmware including an operating system driver that makes the processor* operable to:

detect a device descriptor of the LAN-based NIC;

determine that the device descriptor indicates a capability for assigning a [reserve] media access control (MAC) address to the networked device *that connects to the IHS via the LAN-based NIC*;

*archive an original equipment manufacturer (OEM) MAC address of the LAN-based NIC into a non-volatile storage of the LAN-based NIC; and* provision the LAN-based NIC with [the reserve] *a* MAC address[;

associate the reserve MAC address with the networked device in an inventory data structure for the IHS;

detect a presence of the networked device by an operating system of the IHS;

access a Unified Extensible Firmware Interface (UEFI) reserve MAC protocol to expose a UEFI Preboot eXecution Environment (PXE) driver that is specific to the device descriptor;

load the UEFI PXE driver into a UEFI platform; and provision the LAN-based NIC with the reserve MAC address using the UEFI PXE driver] *in place of the archived OEM MAC Address*.

14. The system of claim 13, wherein *the LAN-based NIC provides LAN connectivity between the distributed IHS and the networked device and* the operating system driver [is] *makes the processor* further operable to:

detect the presence of the networked device during one of a boot of the IHS and a hot plugging of a network system; [and]

provision[, by the operating system driver,] the [reserve] MAC address in the LAN-based NIC *for use in place of an OEM programmed MAC address of the LAN-based NIC; and*

*associate the MAC address with the networked device in an inventory data structure of the IHS.*

15. The system of claim 14, [further comprising an interface of the operating system executed by] *wherein the* processor [and] *is further* operable to:

send a command to a basic input/output system (BIOS) interface to an Unified Extensible Firmware Interface (UEFI) BIOS; and receive the [reserve] MAC address from the UEFI BIOS.

[16. The system of claim 13, wherein the operating system driver is further operable to detect the presence of the networked device during of an operating system of the IHS, the IHS further comprising:

an interface of the operating system executed by the processor and operable to access a Unified Extensible Firmware Interface (UEFI) reserve MAC protocol to expose a UEFI Preboot eXecution Environment (PXE) driver that is specific to the device descriptor and to load the UEFI PXE driver into a UEFI platform that in turn provisions the LAN-based NIC with the reserve MAC address.]

17. The system of claim 13, wherein the operating system driver [is] *makes the processor* further operable to:

detect [a second device descriptor of] a second networked device [that is] connected to the LAN-based NIC; [and]

provision the LAN-based NIC with a second [reserve] MAC address, *different from the MAC address associated with the networked device; and*

*associate the second MAC address with the second networked device*.

18. The system of claim 13, wherein *the* operating system driver [is] *makes the processor* operable to:

detect the [device descriptor of the] networked device [that is] connected to a second LAN-based NIC *having a device descriptor that also indicates a capability for assigning a MAC address to the networked device*; and provision the second LAN-based NIC with [a reserve] *the* MAC address that is associated with the networked device.

*19. The method of claim 1, wherein provisioning of the MAC address in the LAN-based NIC comprises reprogramming the LAN-based NIC with the MAC address received from a Unified Extensible Firmware Interface (UEFI) basic input/output system (BIOS).*

*20. The method of claim 1, wherein the LAN-based NIC is associated with a docking station or dongle to which the networked device physically connects, the method further comprising clearing the MAC address from the LAN-based NIC when the network device is detached from the LAN-based NIC.*

*21. The IHS of claim 7, wherein to provision the MAC address in the LAN-based NIC, the system is further operable to reprogram the LAN-based NIC with the MAC address received from a Unified Extensible Firmware Interface (UEFI) basic input/output system (BIOS).*

*22. The system of claim 13, wherein in provisioning the MAC address in the LAN-based NIC, the operating system driver makes the processor further operable to reprogram the LAN-based NIC with the MAC address received from a Unified Extensible Firmware Interface (UEFI) basic input/output system (BIOS).*

*23. A method comprising:*

*detecting, during a boot of a networked device that locally connects to an IHS via a LAN-based network interface controller (NIC), a device descriptor in the LAN-based NIC, the device descriptor indicative of a capability for assigning a MAC address to the networked device;*

*in response to detecting the device descriptor, exposing an interface of a Unified Extensible Firmware Interface (UEFI) reserve MAC protocol driver;*

*loading a UEFI Preboot eXecution Environment (PXE) driver into a UEFI platform; and*

*provisioning, using the UEFI PXE driver, the NIC with a MAC address.*

*24. The method of claim 23, wherein provisioning of the NIC with the MAC address comprises archiving an original equipment manufacturer (OEM) MAC address in a NIC internal non-volatile storage.*

*25. An information handling system (IHS) comprising:*

*a local area network (LAN) based network interface controller (NIC);*

*a networked device connected to the LAN-based NIC, which locally connects with the IHS, the networked device having a processor operably in communication with the LAN-based NIC to:*

*detect, during a boot of the networked device, a device descriptor in the NIC, the device descriptor indicative of a capability for assigning a MAC address to the networked device;*

*in response to detecting the device descriptor, expose an interface of a Unified Extensible Firmware Interface (UEFI) reserve MAC protocol driver;*

*load a UEFI Preboot eXecution Environment (PXE) driver into a UEFI platform; and*

*provision, using the UEFI PXE driver, the NIC with a MAC address.*

*26. A system that addresses networked devices in a distributed information handling system (IHS), the system comprising:*

*a local area network (LAN) based network interface controller (NIC); and*

*a networked device that locally connects within the distributed IHS via the LAN-based NIC, the networked device having a processor that is communicatively connected to the LAN-based NIC and which executes firmware that makes the processor operable to:*

*detect, during a boot of the networked device, a device descriptor in the LAN-based NIC, the device descriptor indicative of a capability for assigning a MAC address to the networked device;*

*in response to detecting the device descriptor, expose an interface of a Unified Extensible Firmware Interface (UEFI) reserve MAC protocol driver;*

*load a UEFI Preboot eXecution Environment (PXE) driver into a UEFI platform; and*

*provision, using the UEFI PXE driver, the NIC with a MAC address.*

* * * * *